United States Patent
Kimura

(10) Patent No.: US 7,581,144 B2
(45) Date of Patent: Aug. 25, 2009

(54) MICROPROCESSOR AND PROCESSING METHOD THEREOF

(75) Inventor: Katsuyuki Kimura, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 506 days.

(21) Appl. No.: 11/561,672

(22) Filed: Nov. 20, 2006

(65) Prior Publication Data

US 2007/0198817 A1 Aug. 23, 2007

(30) Foreign Application Priority Data

Nov. 24, 2005 (JP) .............................. 2005-339178

(51) Int. Cl.
*G06F 11/00* (2006.01)
(52) U.S. Cl. ........................................ 714/45; 712/227
(58) Field of Classification Search ..................... 714/45
See application file for complete search history.

(56) References Cited

U.S. PATENT DOCUMENTS

| | | | |
|---|---|---|---|
| 5,574,937 A * | 11/1996 | Narain | 712/23 |
| 6,230,261 B1 * | 5/2001 | Henry et al. | 712/240 |
| 6,507,921 B1 | 1/2003 | Buser et al. | |
| 6,516,408 B1 * | 2/2003 | Abiko et al. | 712/227 |
| 6,832,342 B2 * | 12/2004 | Fields et al. | 714/45 |
| 7,213,126 B1 * | 5/2007 | Smaus et al. | 711/217 |
| 7,325,168 B2 * | 1/2008 | Bradley et al. | 714/45 |
| 7,496,902 B2 * | 2/2009 | Levine et al. | 717/128 |
| 2005/0166098 A1 * | 7/2005 | Davis | 714/45 |

* cited by examiner

*Primary Examiner*—Gabriel L Chu
(74) *Attorney, Agent, or Firm*—Oblon, Spivak, McClelland, Maier & Neustadt, P.C.

(57) ABSTRACT

A microprocessor a microprocessor includes: a processor module executing an instruction to generate trace information including the information of the kind and the length of the instruction; an application processing circuit operating in cooperation with the processor module to process a specific application; an address calculating circuit calculating an execution address for executing the instruction based on the information of the instruction length; a data obtaining circuit obtaining data from the application processing circuit when the calculated execution address is located within a range of a designated address; and a trace memory in which the obtained data is stored together with the trace information.

20 Claims, 5 Drawing Sheets

FIG. 2
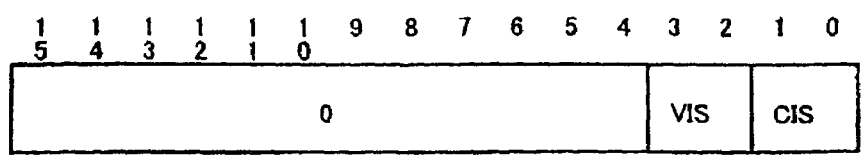
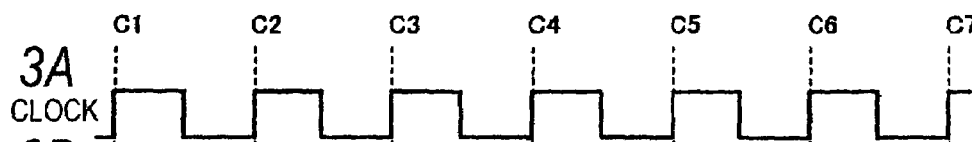
FIG. 3A CLOCK
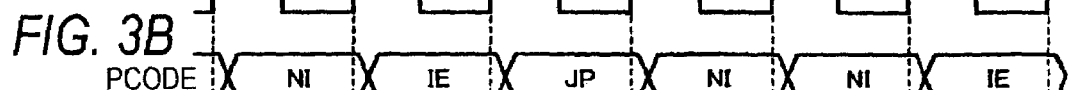
FIG. 3B PCODE
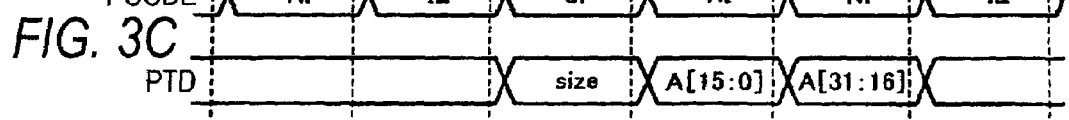
FIG. 3C PTD
FIG. 3D INSTRUCTION
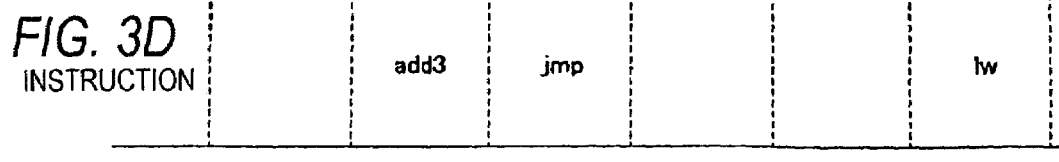
TIME

US 7,581,144 B2

MICROPROCESSOR AND PROCESSING METHOD THEREOF

CROSS-REFERENCE TO RELATED APPLICATIONS

This application is based upon and claims the benefit of priority from Japanese Patent Application No. 2005-339178, filed on Nov. 24, 2005, the entire contents of which are incorporated herein by reference.

BACKGROUND

1. Field

The present invention relates to a microprocessor and processing method thereof, and more particularly to a technique for tracing the operation of the microprocessor.

2. Description of the Related Art

In a process for debugging a program including many instructions or in a performance measuring process of a system, to detect problems arising during a use, the operation of a microprocessor for executing the program is traced. An in-circuit emulator is known that a tracing device for tracing the operation of the microprocessor is incorporated in the microprocessor. The information of the operation of the microprocessor traced by the tracing device (hereinafter referred to as "trace information") is transferred to an analyzing device in an external part of the microprocessor.

Since the microprocessor is operated at high speed, an executing state of the program is hardly analyzed. Therefore, a method for reducing a quantity of the trace information by compressing the trace information and outputting the trace information in a real time or a method for storing the trace information in a memory of the tracing device is employed. Further, a method is proposed that data showing an instruction length is allowed to be included in the compressed trace information (see U.S. Pat. No. 6,507,921, for example).

Further, cases that many functions are loaded in one microprocessor have been increased in accordance with the development of a micro-processing technique. As a result, a processor module for executing an instruction and an application processing circuit for processing other application may be possibly mounted on one microprocessor.

However, even when the operation of the processor module can be completely traced, the operation of the application processing circuit cannot be traced. When the operations of the processor module and the application processing circuit are respectively traced, a quantity of information to be traced by the tracing device is greatly increased.

SUMMARY

According to a first aspect of the present invention, a microprocessor a microprocessor includes: a processor module executing an instruction to generate trace information including the information of the kind and the length of the instruction; an application processing circuit operating in cooperation with the processor module to process a specific application; an address calculating circuit calculating an execution address for executing the instruction based on the information of the instruction length; a data obtaining circuit obtaining data from the application processing circuit when the calculated execution address is located within a range of a designated address; and a trace memory in which the obtained data is stored together with the trace information.

According to a second aspect of the present invention, a processing method of a microprocessor includes: generating trace information including the information of the kind and the length of an executed instruction; processing a specific application by operating in cooperation with the execution of the instruction; calculating an execution address for executing the instruction based on the information of the instruction length; obtaining data of the processed application when the calculated execution address is located within a range of a designated address; and storing the obtained data together with the trace information in a trace memory.

BRIEF DESCRIPTION OF THE DRAWINGS

FIG. 2 shows a schematic diagram showing an example of a format of trace information output by a trace information output circuit according to the embodiment of the present invention;

FIGS. 3A to 3D show time charts showing an operational example of a processor module according to the embodiment of the present invention;

DETAILED DESCRIPTION

Figure 1:
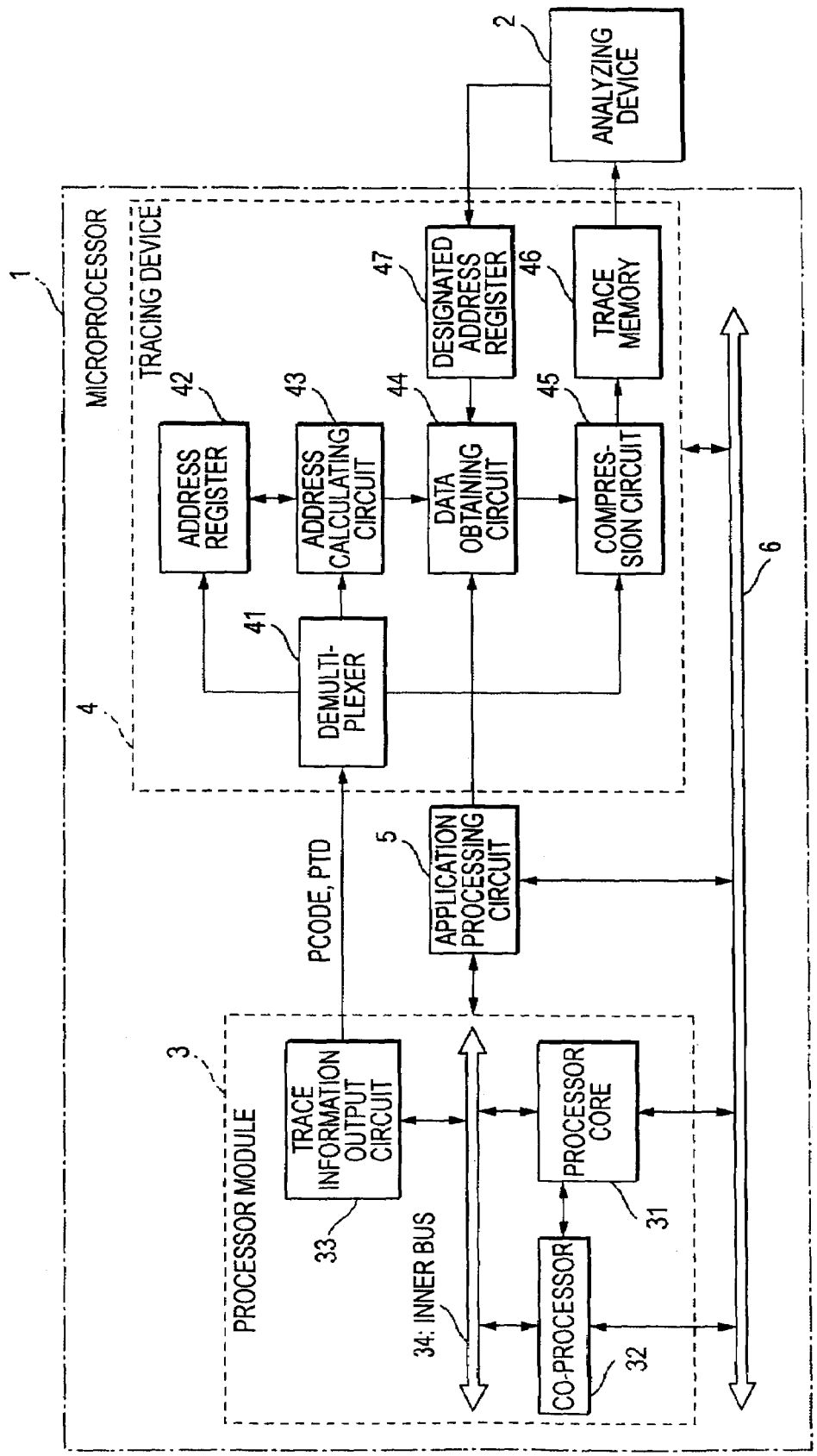
FIG. 1 shows a block diagram showing an entire structural example of a microprocessor according to an embodiment of the present invention.

Now, referring to the drawings, an embodiment of the present invention will be described. In the description of the drawings in the below-described embodiment, the same or similar parts are designated by the same or similar reference numeral.

Entire Structural Example

As shown in FIG. 1, a microprocessor 1 according to an embodiment of the present invention includes a main bus 6, a processor module 3 connected to the main bus 6, an application processing circuit 5 and a tracing device 4. The microprocessor 1 is connected to an analyzing device 2 at the time of debugging. Further, the processor module 3 includes an inner bus 34, and a processor core 31, a co-processor 32 and a trace information output circuit 33 connected to the inner bus 34. The processor module 3 executes an instruction to generate trace information including the information of the kind of the instruction and the size of the instruction (hereinafter referred to as "instruction length"). The application processing circuit 5 operates in cooperation with the processor module 3 to process a specific application.

As the application processing circuit 5, a bus monitor for monitoring data transmitted to the main bus 6 or a digital signal processor (DSP) for executing an arbitrary signal process or the like can be employed. The application processing circuit 5 operates in cooperation with the processor module 3 to generate data of, for example, about 16 bits therein in each cycle. It is assumed that the generated data is intermediate data in an application process and cannot be directly referred to from an external part of the microprocessor 1. The data generated by the application processing circuit 5 is output to the tracing device 4 for the purpose of debugging or measuring a performance.

The tracing device 4 includes an address calculating circuit 43 for cumulatively adding the information of the instruction length from the processor module 3 to calculate an address for executing the instruction, a data obtaining circuit 44 for obtaining the data from the application processing circuit 5 when the address for executing the instruction calculated by the address calculating circuit 43 is located within a range of a designated address and a trace memory 46 in which the data obtained by the data obtaining circuit 44 is stored together with the trace information. Here, the "address for executing the instruction" specifically means a value of a program counter (PC) in the processor core 31 of the processor module 3.

The tracing device 4 correlates the trace information output from the trace information output circuit 33 with the data obtained from the application processing circuit 5 and stores the obtained data in the trace memory 46. Accordingly, based on designation of the address for executing the instruction by a user, the tracing device 4 can trace the data from the application processing circuit 5. Therefore, only a necessary part of the data from the application processing circuit 5 can be selectively stored in the trace memory 46 for the unit of the instruction that can be designated by the address for executing the instruction. As a result, a tracing process meeting a debugging state can be carried out by considering a trade-off between a quantity of the information to be traced and a storage capacity of the trace memory 46.

Structural Example of Processor Module

Now, the structure of the processor module 3 will be described in detail. The processor module 3 has a set of variable-length instructions. Each instruction has the instruction length of, for example, 16 bits or 32 bits. Further, the processor module 3 has two instruction executing modes of a "core mode" and a "very long instruction word (VLIW) mode". At the time of the core mode, execution addresses of the instruction executed by the processor core 31 are continued. However, at the time of operating in the VLIW mode, instructions to the co-processor 32 are arranged after the instructions executed by the processor core 31 in a program memory (an illustration is omitted). Accordingly, during operating in the VLIW mode, the addresses for executing a program in the processor core 31 are arranged with a fixed length of the unit of 32 bits or 64 bits.

The trace information output circuit 33 detects the operations of the processor core 31 and the co-processor 32 through the inner bus 34 and outputs the trace information PCODE and PTD as shown in Table 1 to the tracing device 4.

TABLE 1

| Trace Information | Initial Value |
|---|---|
| PCODE [3:0] | 4' b0000 |
| PTD [15:0] | 16' h0000 |

The trace information PCODE includes the information of the kind of the instruction executed by the processor core 31 in each cycle. On the other hand, the trace information PTD includes an execution address indicating a branch destination of the instruction to be executed by the processor core 31 (refer it to as a "branching address", hereinafter) and the information of the instruction length of a core instruction or a VLIW instruction. In the Table 1, an example is shown that the trace information PCODE has 4 bits and the trace information PTD has 16 bits Further, the initial value of the trace information PCODE is set to "4' b0000" and the initial value of the trace information PTD is set to "16' h0000".

An example of a format of the trace information PTD is shown in FIG. 2. 2 bit data CIS shows the instruction length of the core instruction. As one example, when the data CIS shows "00", this means that there is no executed core instruction. When the data CIS shows "01", this means that the core instruction of 16 bits is executed. When the data CIS shows "01", this means that the core instruction of 32 bits is executed.

2 bit data VIS shows whether or not a mode is a VLIW mode and showing the instruction length of the VLIW instruction when the mode is the VLIW mode. As one example, when the data VIS shows "00", this means that the instruction is not executed by the co-processor 32, that is, the mode is the core mode. When the data VIS shows "01", this means that the instruction having the instruction length of 32 bits is executed in the VLIW mode. When the data VIS shows "10", the instruction having the instruction length of 64 bits is executed in the VLIW mode.

A relation between the trace information PCODE and PTD is shown in Table 2. As shown in Table 2, when the processor core 31 and the co-processor 32 execute the instruction having no branch, the trace information PTD includes information having the instruction length of the instruction having no branch. As compared therewith, when the processor core 31 and the co-processor 32 execute the instruction having the branch, the trace information PTD includes the information of the branching address.

TABLE 2

| PCODE | PTD |
|---|---|
| No Instruction (NI) | — |
| Instruction Executed (IE) | Instruction length |
| Branch Taken (BT) | Branching address |
| Jump (JP) | Branching address |
| Jump.VLIW.toggle (JV) | Branching address |
| Exception (EX) | Branching address |
| Repeat Taken (RT) | Branching address |
| Debug Mode (DM) | — |
| Branch Not Established (BN) | Instruction length |

"NI" shown in the Table 2 is output when there is no instruction to be executed. When the trace information PCODE indicates "NI", as the trace information PTD, the information of both the instruction length and the branching address is not output.

When the trace information PCODE indicates "IE", this means that the current instruction of the processor core 31 executes an instruction that does not apply to any of below-described instructions (1) to (4) as follows:

(1) A branch instruction that satisfies a condition of BT/JP/JV/BN;

(2) An instruction at the time of generating an exception that satisfies a condition of EX;

(3) The last instruction of a repeat block that satisfies a condition of RT; and (4) An instruction during a debug mode that satisfies a condition of DM.

Further, when the trace information PCODE indicates "IE", the information of the instruction length is output as the trace information PTD. As the instruction corresponding to "IE", for example, an adding instruction "add3" and a stop instruction "halt," "sleep" or the like are exemplified.

"BT" shown in the Table 2 means that the current instruction of the processor core 31 generates a branch in accordance with a branch/jump instruction in which a branching part is statically specified from a program executing object (a source). When the trace information PCODE shows "BT", the information of the branching address is output as the trace information PTD. As the instruction corresponding to "BT", exemplified are a bra instruction, a beqz instruction, a bnez instruction, a beqi instruction and a bsr instruction or the like. The bra instruction represents an instruction for jumping to an arbitrary address for an execution address relative to a PC. The bsr instruction represents an instruction for jumping to an arbitrary address of a sub-routine for an execution address relative to a PC. The beqz instruction, the bnez instruction and the beqi instruction represent instructions branching when a prescribed flag is set or cleared.

"JP" shown in the Table 2 means that the current instruction of the processor core 31 is a branch/jump instruction in which a branching part is not statically recognized from the program executing object (source) or a return instruction A dret instruction returned from the debug mode also corresponds to "JP". When the trace information PCODE indicates "JP", the information of the branching address is output as the trace information PTD. As the instruction corresponding to "JP", exemplified are a jmp instruction, a jsr instruction, a ret instruction, a reti instruction and the dret instruction. The jmp instruction represents an instruction for jumping to an arbitrary address. The jsr instruction represents an instruction for jumping to an arbitrary address of a sub-routine. The ret instruction, the reti instruction and the dret instruction represent instructions for returning from the sub-routine.

"JV" shown in the Table 2 means that the current instruction of the processor core 31 is a jump instruction or a return instruction for generating a toggle of the VLIW mode or the core mode. When the trace information PCODE indicates "JV", the information of the branching address is output as the trace information PTD. As the instruction corresponding to "JV", exemplified are the jmp instruction, a jsrv instruction, a bsrv instruction, the ret instruction and the reti instruction or the like.

"EX" shown in the Table 2 means that other exceptions than a debug exception and a reset exception are generated in the current instruction of the processor core 31. When the trace information PCODE indicates "JV", the information of the branching address is output as the trace information PTD. As the instruction corresponding to "JV", exemplified are the jmp instruction, a jsrv instruction, a bsrv instruction, the ret instruction and the reti instruction or the like.

"RT" shown in the Table 2 is output when the last instruction of the repeat block returns to the first part of the repeat block. When the last instruction of the repeat block passes the repeat block, even the last instruction of the repeat block corresponds to "IE". When the trace information PCODE indicates "RT", the information of the branching address is output as the trace information PTD.

"DM" shown in the Table 2 means the generation of a debug exception, the execution of the instruction during the debug mode and a stalling state, or the debug mode. When the trace information PCODE indicates "DM", the information of both the instruction length and the branching address is not output as the trace information PTD.

"BN" shown in the Table 2 means that in the current instruction of the processor core 31, a branch is not established in accordance with the branch/jump instruction in which the branching part is statically understood from a source code. When the trace information PCODE indicates "BN", the information of the instruction length is output as the trace information PTD. As the instruction corresponding to "BN", exemplified are the bra instruction, the beqz instruction, the bnez instruction, the beqi instruction and the bsr instruction or the like.

Operational Example of Processor Module

Now, referring to a time chart shown in FIGS. 3A to 3D, an operational example of the processor module 3 according to the embodiment of the present invention will be described below. In this case, an example that the processor module 3 is operated under the core mode is described.

In a cycle C1 shown in FIGS. 3A to 3D, since the processor core 31 does not execute the instruction as shown in FIG. 3D, the trace information PCODE shown in FIG. 3B indicates "NI" shown in the Table 2.

In a cycle C2, since the processor core 31 executes the adding instruction "add3" as shown in FIG. 3D, the trace information PCODE shown in FIG. 3B indicates "IE". In the cycle C2, as the trace information PTD, the information of the instruction length is not generated. The information of the instruction length is generated in a cycle C3 as a next cycle.

In a cycle C3, since the processor core 31 outputs that the processor core executes the jump instruction "jmp", the processor core 31 outputs "JP" as the trace information PCODE. At the same time, the processor core outputs the information of the instruction length (size) corresponding to the instruction "add3" executed in the cycle C2 as the trace information PTD.

In cycles C4 and C5, the processor core 31 does not execute the instruction. Accordingly, in the cycles C4 and C5, "NI" is output as the trace information PCODE. In accordance with "JP" output in the cycle C3, the branching (jump) addresses are output to the two cycles including the cycles C4 and C5.

In a cycle C6, since the processor core 31 executes a load instruction "lw", the trace information PCODE shown in FIG. 3B indicates "IE".

Structural Example of Tracing Device

Now, the structure of the tracing device 4 shown in FIG. 1 will be described below in detail. The tracing device 4 includes a demultiplexer 41, an address register 42, a compression circuit 45 and a designated address register 47 in addition to the above-described address calculating circuit 43, the data obtaining circuit 44 and the trace memory 46. An input of the demultiplexer 41 is connected to an output of the trace information output circuit 33 of the processor module 3. An input of the address register 42 is connected to the outputs of the demultiplexer 41 and the address calculating circuit 43. An input of the address calculating circuit 43 is connected to the outputs of the demulatiplexer 41 and the address register 42. An input of the designated address register 47 is connected to the output of the analyzing device 2 outside the microprocessor 1 during a debugging operation. An input of the data obtaining circuit 44 is connected to the outputs of the application processing circuit 5, the address calculating circuit 43 and the designated address register 47. An input of the compression circuit 45 is connected to the outputs of the demultiplexer 41 and the data obtaining circuit 44. An input of the trace memory 46 is connected to the output of the compression circuit 45. An output of the trace memory 46 is connected to the input of the analyzing device 2 outside the microprocessor 1 during the debugging operation.

The demultiplexer 41 outputs the information of the branching address of the trace information PCODE and PTD to the address register 42, outputs the information of the instruction length to the address calculating circuit 43 and outputs the entire trace information to the compression circuit 45. The address register 42 holds the branching address and sequentially holds the execution addresses calculated by the address calculating circuit 43. The address calculating circuit 43 adds address values held in the address register 42 to the information of the instruction length to calculate the execution addresses.

The designated address register 47 holds the information of the range of a designated address transferred from the analyzing device 2. The range of the designated address is set to, for example, a range of "an address X1 to an address X2". Otherwise, a setting method may be employed in such a way that the range of the designated address is located within a range of "a first address to an address X" or a range of "an address X to the last address".

The data obtaining circuit 44 decides whether or not the execution address calculated by the address calculating circuit 43 is located within the range of the designated address held by the designated address register 47. Only when the execution address is located within the range of the designated address, the data obtaining circuit 44 transmits the data from the application processing circuit 5 to the compression circuit 45.

The compression circuit 45 compresses the data obtained by the data obtaining circuit 44 and the trace information generated by the trace information output circuit 33 and stores the compressed data and trace information in the trace memory 46.

Figure 4:
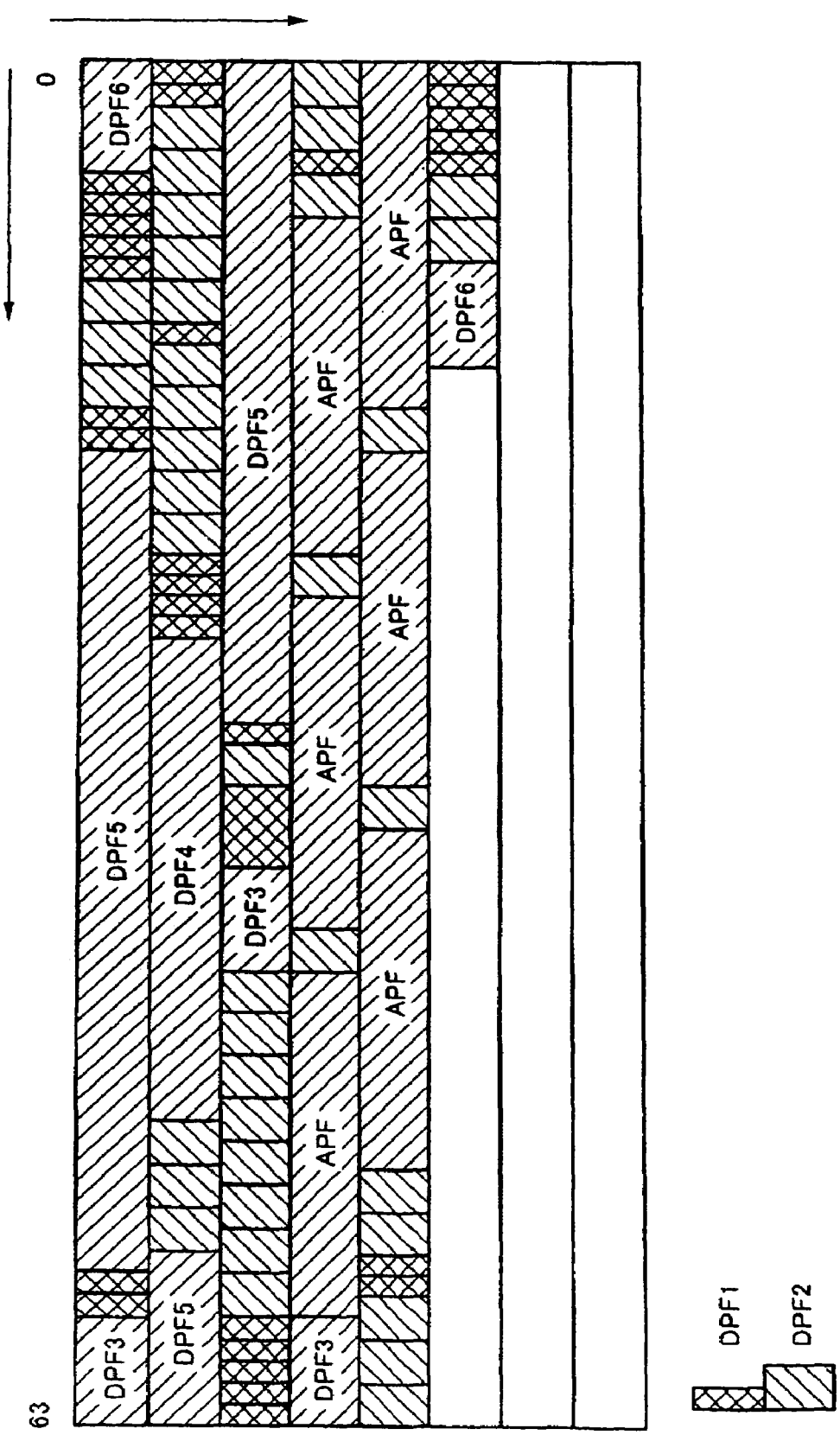
FIG. 4 shows a schematic diagram showing an example of a data storing format in a trace memory according to the embodiment of the present invention.

Further, in the trace memory 46, the data and the trace information compressed in such a format as shown in FIG. 4 are sequentially stored. In an example shown in FIG. 4, the compressed trace information DPF1, DPF2, DPF3, DPF4, DPF5 and DPF6 include information concerning whether or not the instruction is executed by the processor module 1, whether or not the branch is generated and the branching address obtained when the branch is generated. The compressed trace information DPF1, DPF2, DPF3, DPF4, DPF5 and DPF6 is restored and analyzed by using the analyzing device 2 shown in FIG. 1, so that a user can know how the instruction is executed on the processor module 3.

Further, the data from the application processing circuit 5 corresponds to data APF shown in FIG. 4. The data APF is embedded in a result analyzed by a debug program operating on the analyzing device 2 and the data APF is displayed on a display device (an illustration is omitted) together with the trace information. As a result, the operational information of the application processing circuit 5 can be obtained in a form synchronizing with the operation of the processor module 3.

Accordingly, in the tracing device 4 according to the embodiment of the present invention, to achieve a tracing operation synchronously with the executing state of the program in the processor for debugging the generated data or analyzing an execution and to compress a quantity of the tracing operation, the trace information can be obtained from the application processing circuit 5 by the execution address for the program executed in the processor.

After the tracing operation is completed, the analyzing device 2 reads the last stored address of the trace memory 46 together with the contents of the trace memory 46. The analyzing device 2 uses an object/source list of the program being executed on the processor module 3 to analyze the contents of the trace memory 46 and output the executing state of the program of the processor module 3 that is currently being traced.

As described above, the tracing device 4 can trace the operation of the application processing circuit 5 during a period in which the processor module 3 executes a part of the program.

Example of Tracing Operation

Figure 5:
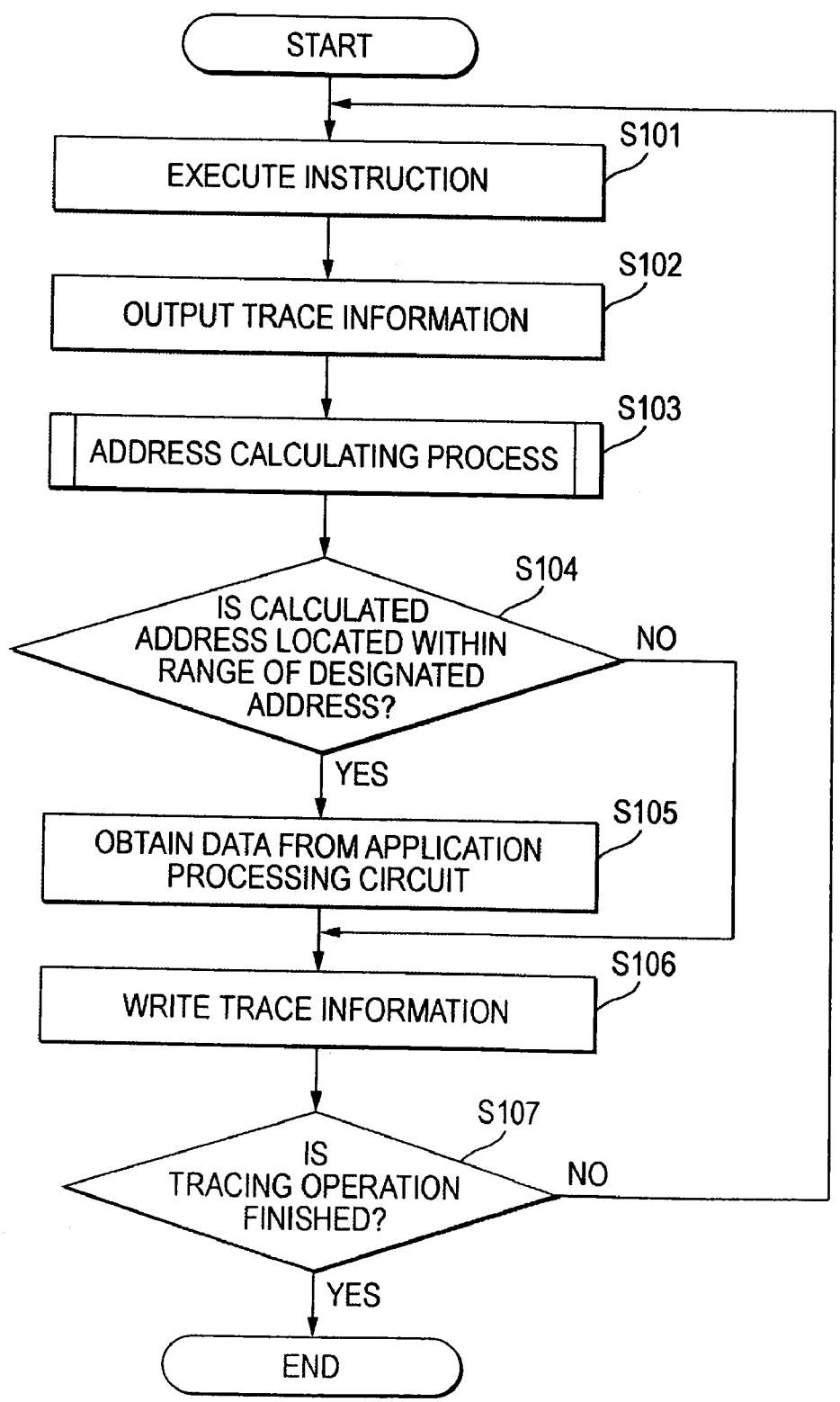
FIG. 5 shows a flowchart showing an operational example of a tracing device according to the embodiment of the present invention.

Now, referring to a flowchart shown in FIG. 5, an example of the tracing operation by the tracing device 4 according to the embodiment of the present invention will be described below.

In step S101, the processor module 3 shown in FIG. 1 executes the instruction. Specifically, the processor module 3 executes one instruction in the core mode or the VLIW mode.

In step S102, the trace information output circuit 33 outputs the trace information to the tracing device 4.

In step S103, the address calculating circuit 43 calculates the address for executing the instruction executed by the processor module 3 on the basis of the trace information obtained in the step S102. The detail of an operation for calculating the address for executing the instruction will be described later with reference to FIG. 6.

In step S104, the data obtaining circuit 44 decides whether or not the address for executing the instruction calculated in the step S103 is located within the range of the designated address held by the designated address register 47. When it is decided that the address for executing the instruction is located within the range of the designated address, the procedure proceeds to step S105. On the contrary, when it is decided that the address for executing the instruction is not located within the range of the designated address, the procedure proceeds to S106.

In the step S105, the data obtaining circuit 44 obtains the data from the application processing circuit 5 and transmits the obtained data to the compression circuit 45. When the obtained data is transmitted to the compression circuit 45, the procedure proceeds to the step S106.

In the step S106, the compression circuit 45 compresses the data obtained by the data obtaining circuit 44 and the trace information generated by the trace information output circuit 33 and stores the compressed data and the trace information in the trace memory 46.

In step S107, the analyzing device 2 decides whether or not the tracing operation is to be completed. When it is decided that the tracing process is to be completed, the tracing operation is completed. When it is decided that the tracing operation is not to be completed, the procedure returns to the step S101.

Example of Operation for Calculating Address for Executing Instruction

Figure 6:
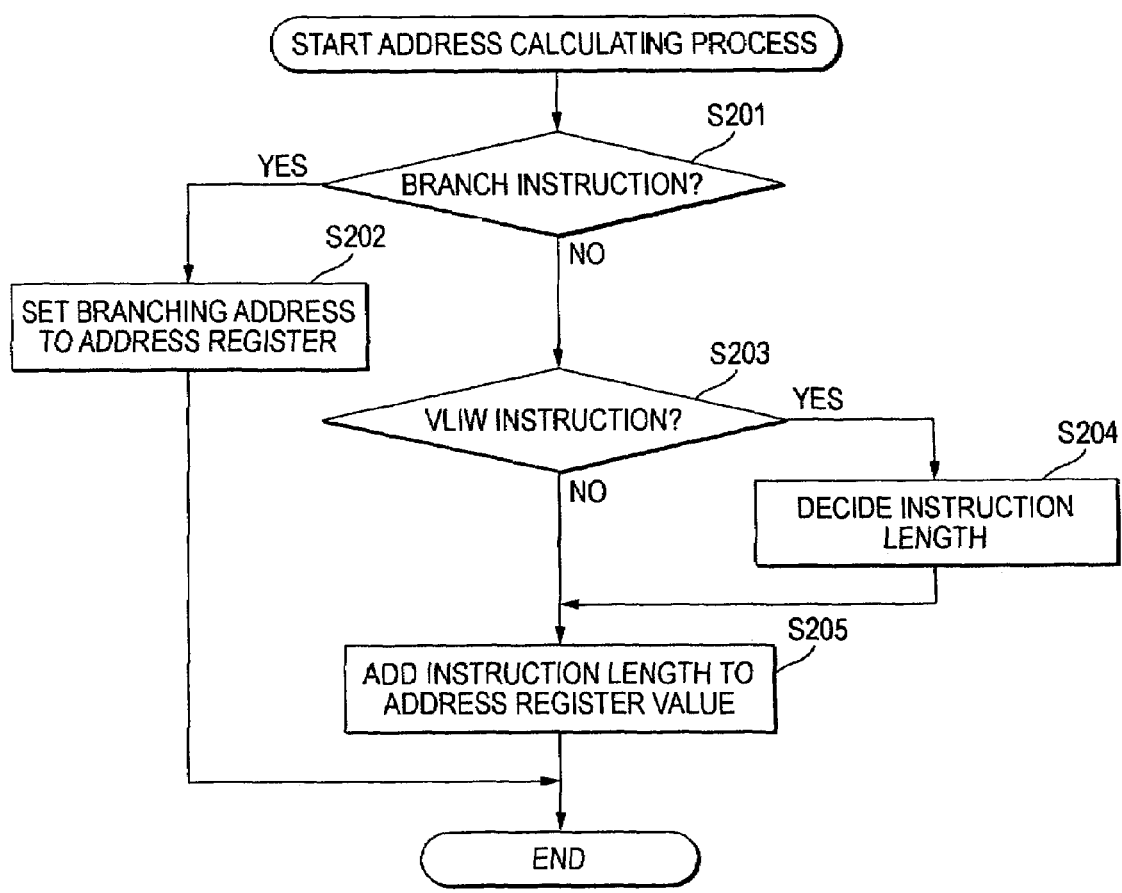
FIG. 6 shows a flowchart showing an operational example of an address calculating circuit according to the embodiment of the present invention.

Now, referring to a flowchart shown in FIG. 6, the detail of the operation for calculating the address for executing the instruction of FIG. 5 (Step S103) will be described below.

In step S201, the demultiplexer 41 decides whether or not the instruction executed by the processor module 3 is an instruction having the branch on the basis of the trace information PCODE and PTD. When it is decided that the instruction executed by the processor module 3 is the instruction having the branch, the procedure proceeds to step S202. When it is decided that the instruction executed by the processor module 3 is the instruction having no branch, the procedure proceeds to step S203.

In the step S202, the demultiplexer 41 sets the branching address to the address register 42.

In the step S203, the demultiplexer 41 decides whether or not the instruction executed by the processor module 3 is the VLIW instruction on the basis of the trace information PTD. When it is decided that the instruction executed by the processor module 3 is the VLIW instruction, the procedure proceeds to step S204. On the contrary, when it is decided that the instruction executed by the processor module 3 is not the VLIW instruction, the procedure proceeds to step S205.

In the step S204, the address calculating circuit 43 decides the instruction length of the VLIW instruction. For example, the instruction length of the VLIW instruction is decided to be either 32 bits or 64 bits. When the instruction length of the VLIW instruction is decided, the procedure proceeds to the step S205.

In the step S205, the address calculating circuit 43 adds an address value held in the address register 42 to the instruction length of the instruction executed by the processor module 3 to calculate the address for executing the instruction.

As described above in detail, in the microprocessor 1 according to the embodiment of the present invention, the tracing device 4 can be provided in which the address for executing the instruction is calculated without using a binary (source) for executing the program, and accordingly, the operation of the application processing circuit 5 can be selectively traced in accordance with the calculated address for executing the instruction. As a result, only a necessary part for debugging or measuring an execution of the data from the application processing circuit 5 can stored in the trace memory 46.

OTHER EMBODIMENTS

As mentioned above, the present invention is described by way of the embodiment, however, it is not to be understood that the description and the drawings forming a part of the disclosure limits the present invention. From the disclosure, various substitute forms, embodiments, and applied techniques may be apparent to persons with ordinary skill in the art.

In the above-described embodiment, an example is stated that one processor module 3 is mounted on the microprocessor 1. However, a plurality of processor modules 3 may be mounted on the microprocessor. In this case, one tracing device may be allocated to the plurality of processor modules or a multiplexer may be connected between the plurality of processor modules and one tracing device to suitably select the processor module as an object to be traced.

Further, in the tracing device 4, an example is described that there is one range of the designated address. However, a plurality of ranges of designated addresses may be provided. When the plurality of ranges of the designated addresses are provided, a plurality of designated address registers 47 may be provided or a plurality of ranges of designated addressed may be set to one designated address register 47.

Further, in the above-description, as the application processing circuit 5, the bus monitor or the DSP or the like may be employed, however, any circuit for receiving an instruction of processing contents or data from the processor module 3 corresponds to the application processing circuit 5.

As described above, it is to be understood that the present invention includes various embodiments that are not described herein.

What is claimed is:

1. A microprocessor comprising:
a processor module executing an instruction to generate trace information including the information of the kind and the length of the instruction;
an application processing circuit operating in cooperation with the processor module to process a specific application;
an address calculating circuit calculating an execution address for executing the instruction based on the information of the instruction length;
a data obtaining circuit obtaining data from the application processing circuit when the calculated execution address is located within a range of a designated address; and
a trace memory in which the obtained data is stored together with the trace information.

2. The microprocessor according to claim 1, further comprising:
a compression circuit compressing the obtained data and the trace information and storing the compressed data and information in the trace memory.

3. The microprocessor according to claim 1, further comprising:
an address register holding an address value of the execution address calculated by the address calculating circuit.

4. The microprocessor according to claim 3, wherein the address calculating circuit calculates the execution address of the instruction based on the address value held in the address register and the information of the instruction length output from the processor module.

5. The microprocessor according to claim 1, wherein:
the processor module decides whether or not the instruction is accompanied by a branch, and when the instruction is not accompanied by the branch, the processor module generates the information of the instruction length and when the instruction is accompanied by the branch, the processor module generates the information of a branching address; and
the address calculating circuit adds the information of the branching address to the information of the instruction length to obtain the execution address for the instruction.

6. The microprocessor according to claim 5, wherein:
the processor module further generates VLIW instruction information showing the instruction length of Very Long Instruction Word type instruction when the Very Long Instruction Word type instruction is executed; and
the address calculating circuit calculates the execution address for the instruction based on the VLIW instruction information.

7. The microprocessor according to claim 5, further comprising:
an address register holding an address value of the execution address calculated by the address calculating circuit.

8. The microprocessor according to claim 7, wherein the address register holds an address value of the branching address.

9. The microprocessor according to claim 8, wherein the address calculating circuit calculates the execution address of the instruction based on the address value held in the address register and the information of the instruction length output from the processor module.

10. The microprocessor according to claim 1, wherein:
the processor module generates VLIW instruction information showing the instruction length of Very Long Instruction Word type instruction when the Very Long Instruction Word type instruction is executed; and
the address calculating circuit calculates the execution address for the instruction based on the VLIW instruction information.

11. A processing method of a microprocessor comprising:
generating trace information including the information of the kind and the length of an executed instruction;
processing a specific application by operating in cooperation with the execution of the instruction;
calculating an execution address for executing the instruction based on the information of the instruction length;
obtaining data of the processed application when the calculated execution address is located within a range of a designated address; and
storing the obtained data together with the trace information in a trace memory.

12. The method according to claim 11, further comprising:
compressing the obtained data and the trace information and storing the compressed data and information in the trace memory.

13. The method according to claim 11, further comprising:
holding an address value of the calculated execution address in an address register.

14. The method according to claim 13, wherein the execution address of the instruction is calculated based on the address value held in the address register and the information of the instruction length contained in the trace information.

15. The method according to claim 11, wherein:
the generating the trace information includes deciding whether or not the instruction is accompanied by a branch, generating the information of the instruction length when the instruction is not accompanied by the branch, and generating the information of a branching address when the instruction is accompanied by the branch; and
the calculating the execution address includes adding the information of the branching address to the information of the instruction length.

16. The method according to claim 15, wherein:
the generating the trace information further includes generating VLIW instruction information showing the instruction length of Very Long Instruction Word type instruction when the Very Long Instruction Word type instruction is executed; and
the execution address for the instruction is calculated based on the VLIW instruction information.

17. The method according to claim 15, further comprising:
holding an address value of the calculated execution address in an address register.

18. The method according to claim 17, further comprising:
holding an address value of the branching address in the address register.

19. The method according to claim 18, wherein the execution address of the instruction is calculated based on the address value held in the address register and the information of the instruction length contained in the trace information.

20. The method according to claim 11, wherein:
the generating the trace information further includes generating VLIW instruction information showing the instruction length of Very Long Instruction Word type instruction when the Very Long Instruction Word type instruction is executed; and
the execution address for the instruction is calculated based on the VLIW instruction information.

* * * * *